United States Patent

Udagawa

[11] Patent Number: 5,004,250
[45] Date of Patent: Apr. 2, 1991

[54] METAL PLATE WITH A BEAD

[75] Inventor: Tsunekazu Udagawa, Ichikawa, Japan

[73] Assignee: Ishikawa Gasket Co., Ltd., Tokyo, Japan

[21] Appl. No.: 496,997

[22] Filed: Mar. 21, 1990

[51] Int. Cl.$^5$ .................. F16J 15/00; F16K 41/00
[52] U.S. Cl. ..................... 277/236; 277/235 B
[58] Field of Search ............... 277/211, 235 B, 236, 277/213, 207 R; 220/72; 428/35.3, 36.9, 83, 174, 179, 184

[56] References Cited

U.S. PATENT DOCUMENTS

| 423,833 | 3/1890 | Stiveson | 220/72 |
| 1,391,998 | 9/1921 | Currie | 277/236 |
| 3,438,507 | 4/1969 | Kreuger | 220/72 |
| 3,547,299 | 12/1970 | Kepple | 220/72 |
| 3,956,543 | 5/1976 | Stangeland | 428/179 |
| 4,088,347 | 5/1978 | Brüggmann et al. | 277/236 |

Primary Examiner—Thomas B. Will
Assistant Examiner—J. Folker
Attorney, Agent, or Firm—Kanesaka and Takeuchi

[57] ABSTRACT

A metal plate of the present invention includes at least one bead having a bead body and a bead end portion terminating in the middle of the plate. The bead end portion has curved edges connected to edges of the bead body. The distance between the curved edges of the bead end portion increases as the distance from an end of the bead body increases. Also, the height of the bead end portion gradually decreases as it approaches edges thereof. The metal plate may be used as a gasket or may be combined with other metal plates to constitute a steel laminate gasket.

5 Claims, 1 Drawing Sheet

METAL PLATE WITH A BEAD

BACKGROUND OF THE INVENTION AND RELATED ART STATEMENT

The present invention relates to a metal plate with a bead, more particularly to a metal plate wherein a bead terminates inside the metal plate. The metal plate of the invention can be used solely as a metal plate gasket, or can be combined with other metal plates to form a steel laminate gasket.

In a metal gasket, when a hole is to be sealed, a bead is formed around the hole. When the gasket with the bead is compressed, the bead deforms to provide surface pressure therearound, by which an area around the hole is securely sealed. Also, a bead may be formed on a metal plate as explained hereinafter.

In a gasket for an internal combustion engine, especially a cylinder head gasket, in case a cylinder head is firmly attached to a cylinder block, equal surface pressure may not be formed between the cylinder head and cylinder block. Unbalanced surface pressure is caused by, for example, unequal arrangement of cylinder holes and other holes, or bolts for connecting the cylinder head and cylinder block. Unbalanced surface pressure may happen in case a cylinder head bends relative to a cylinder block by heat in use.

In case unbalanced surface pressure occurs, surface pressure must be balanced. Otherwise, unbalanced surface pressure causes leakage around holes to be sealed.

In case unbalanced surface pressure is formed between a cylinder head and cylinder block, a thin metal plate may be attached to a part of a gasket, or a bead may be formed in a plate at a portion where special support is required. This kind of bead extends at a portion of a gasket and terminates in a middle of a metal plate.

Namely, as shown in FIGS. 1 and 2, a bead 10 terminates in a middle of a plate 11. At an end of the bead 10, side edges 12 converge together, and the height of the bead 10 decreases.

On the other hand, surface pressure obtained by a bead is determined by width and height of the bead in case the same metal plate is used. Namely, as width and height of a bead decrease, surface pressure increases though compressibility decreases. Therefore, in case the side edges 12 converge and the height of the bead decreases as in the conventional bead 10, surface pressure at an end of the bead 10 becomes strong.

This kind of strong surface pressure at an end of a bead causes unbalance of surface pressure, which may cause leakage around holes to be sealed. Namely, in case a bead terminates in a middle of a plate, unbalanced surface pressure occurs, so that fluid inside holes may leak therefrom.

Therefore, one object of the present invention is to provide a metal plate with a bead, in which surface pressure gradually decreases at an end of the bead when the bead is compressed.

Another object of the invention is to provide a metal plate as stated above, which can be easily and economically manufactured.

Further objects and advantages of the invention will be apparent from the following description of the invention.

SUMMARY OF THE INVENTION

In accordance with the present invention, a metal plate is made of a material having elasticity, such as a stainless steel. The plate is provided with at least one bead formed of a bead body for providing surface pressure when the bead is compressed, and a bead end portion. The bead end portion extends from the bead body and terminates in the middle of the metal plate.

The bead body has two first side edges to define the width of the bead, and projects outwardly relative to the metal plate. Also, the bead end portion has two second side edges connected to the first side edges, respectively. The second side edges open outwardly such that the distance between the second side edges increases as the distance from the bead body increases. As a result, when the metal plate is compressed, surface pressure at the bead end portion can gradually decrease as it approaches an end of the bead end portion.

The height of the bead end portion, i.e. a distance from the outer surface of the metal plate to a portion of the outer surface of the bead end portion, gradually decreases as the distance from the bead body increases. Namely, the height of the bead body gradually lowers at the bead end portion.

The bead end portion further includes a third side edge situated between the second side edges at an opposite side of the bead body. The third side edge may extend substantially perpendicularly to the first side edges of the bead body. Alternatively, the second and third side edges curves at the same radii to form a shape similar to a circle.

DETAILED DESCRIPTION OF PREFERRED EMBODIMENTS

Figure 1:
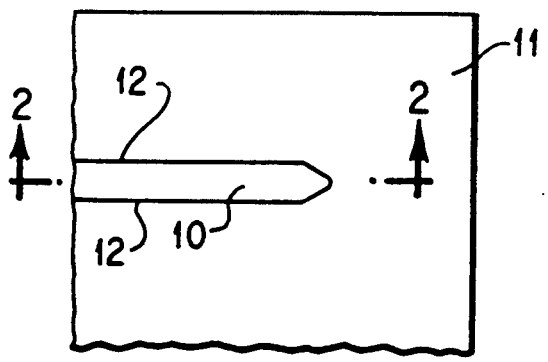
FIG. 1 is a partial plan view of a conventional metal plate with a bead.
Figure 2:
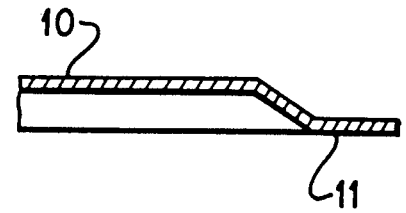
FIG. 2 is an enlarged section view taken along line 2—2 in FIG. 1.
Figure 3:
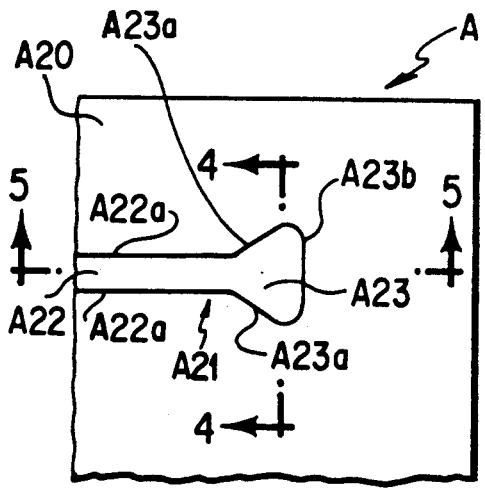
FIG. 3 is a partial plan view of a first embodiment of a metal plate in accordance with the present invention.
Figure 4:
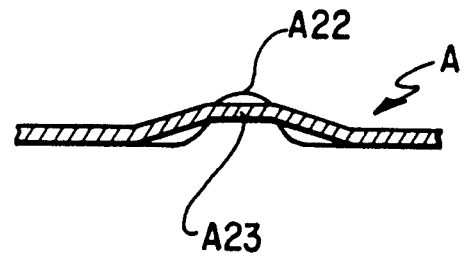
FIG. 4 is an enlarged section view taken along line 4—4 in FIG. 3.
Figure 5:
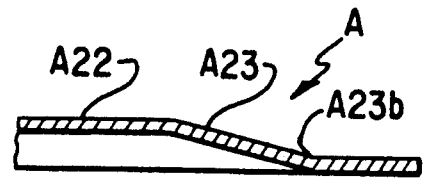
FIG. 5 is an enlarged section view taken along line 5—5 in FIG. 3.

Referring to FIGS. 3-5, a first embodiment A of a metal plate of the invention is shown. The metal plate A includes a plate A20 and a bead A21 terminating in the middle of the plate A20, for showing the present invention.

In the metal plate A, however, other members may be included. For example, in case the metal plate A is used as a cylinder head gasket, the metal plate A may include cylinder holes, water holes, bolt holes, oil holes, push rod holes and sealing means for sealing around the holes. Further, the metal plate A may be combined with other metal plates to constitute a steel laminate gasket.

Since these holes, sealing means and other metal plates are not subject matter of the present invention, explanation is omitted in the specification. However, in the present invention, the metal plate A20 may include other holes, such as cylinder holes, water holes and so on, and may be utilized together with other metal plates to constitute a steel laminate gasket.

The bead A21 is formed of a bead body A22 and a bead end portion A23. The bead body A22 is defined by curved edges A22a extending parallel to each other and projects upwardly from the plate A20 to have constant height. The bead body A22 is formed on the plate A20 at a portion where specific surface pressure is required when the plate A20 is compressed.

The bead end portion A23 has two curved edges A23a extending outwardly from ends of the respective curved edges A22a, and an edge A23b between the curved edges A23a. Namely, the curved edges A23a bend relative to the curved edges A22a so that the distance between the curved edges A23a increases as the distance from an end of the bead body A22 increases.

Also, the height of the bead end portion A23 gradually decreases as the distance from the end of the bead body A22 increases. Further, the curvature of the curved edge A23a decreases as the distance from the end of the bead body A22 increases.

In use, when the plate A20 is tightened, the bead body A22 is compressed to provide certain surface pressure thereat. In the bead end portion A23, the width of the bead end portion A23 gradually increases, and the height of the bead end portion A23 gradually decreases. Therefore, surface pressure gradually decreases as it approaches the edge A23b.

In the bead A21, when the plate A20 is tightened, the bead body A22 can provide a required surface pressure, which decreases gradually at an end of the bead body A22. As a result, it is possible to provide a required surface pressure on a plate.

Figure 6:
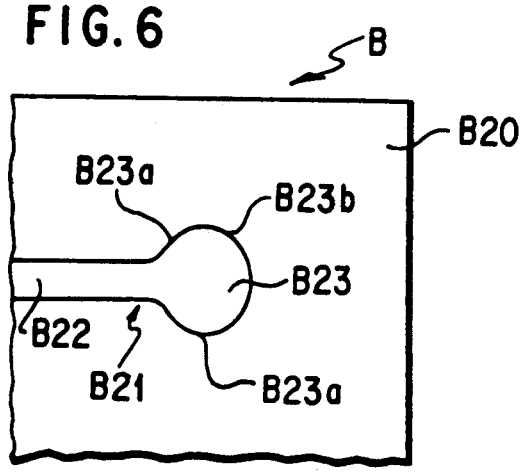
FIG. 6 is a partial plan view of a second embodiment of a metal plate of the invention.

FIG. 6 shows a second embodiment B of a metal plate of the invention. The metal plate B includes a bead B21 formed of a bead body B22 and a bead end portion B23, similar to the metal plate A20. In the metal plate B, however, the bead end portion B23 has a shape similar to a circle.

Namely, in the metal plate B, a curved edge B23b situated at an opposite side of the bead body B22 has curvature or radius substantially the same as those of cured edges B23a adjacent the bead body B22. The height of the bead end portion B23 gradually decreases as the distance from the end of the bead body B22 increases.

Since the curved edges B23a, B23b form a circular shape, when the bead end portion B23 is compressed, surface pressure formed at the bead end portion B23 does not concentrate at one portion and is spread properly over the curved edges B23a, B23b. In the metal plate B, surface pressure formed at the bead can be gradually reduced.

As explained above, in case a bead terminates in a middle of a metal plate, a bead end portion is enlarged immediately after a bead body, and the height of the bead end portion is gradually decreased. As a result, when the bead is compressed, no strong surface pressure is formed at the bead end portion.

While the invention has been explained with reference to the specific embodiments of the invention, explanation is illustrative and the invention is limited only by the appended claims.

What is claimed is:

1. A metal plate for a gasket, comprising,
   an elastic plate with an outer surface, and
   at least one bead formed on the elastic plate, said bead having a bead body to provide surface pressure thereat and a bead end portion terminated inside the elastic plate, said bead body projecting outwardly relative to the elastic plate and having first side edges to define a width of the bead body therebetween, said width of the bead body being substantially constant so that the bead body with the constant width extends for a predetermined distance inside the elastic plate, said bead end portion having second side edges connected to the first side edges, respectively, distance between the second side edges increasing as distance from an end of the bead body increases so that surface pressure at the bead end portion, when the metal plate is compressed, can gradually decrease as it approaches an end of the bead end portion.

2. A metal plate according to claim 1, wherein height from the outer surface of the elastic plate to a portion of an outer surface of the bead end portion gradually decreases as distance from the end of the bead body increases.

3. A metal plate according to claim 2, wherein said bead end portion further includes a third side edge situated between the second side edges at an opposite side of the bead body.

4. A metal plate according to claim 3, wherein said third side edge extends substantially perpendicular to the first side edges of the bead body.

5. A metal plate according to claim 3, wherein said second and third side edges curve at the same radii to thereby form a shape similar to a circle.

* * * * *